(12) United States Patent
Johnson

(10) Patent No.: US 11,005,977 B2
(45) Date of Patent: May 11, 2021

(54) PACKET FILTERING USING BINARY SEARCH TREES

(71) Applicant: Viavi Solutions Inc., Milpitas, CA (US)

(72) Inventor: Sherwood Johnson, Shakopee, MN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 343 days.

(21) Appl. No.: 15/252,943

(22) Filed: Aug. 31, 2016

(65) Prior Publication Data
US 2018/0062998 A1    Mar. 1, 2018

(51) Int. Cl.
*H04L 12/44* (2006.01)
*H04L 12/741* (2013.01)
*H04L 29/06* (2006.01)

(52) U.S. Cl.
CPC ............ *H04L 69/22* (2013.01); *H04L 45/745* (2013.01); *H04L 12/44* (2013.01)

(58) Field of Classification Search
CPC . H04L 45/745; H04L 69/22; G06F 17/30961; G06F 2207/222
See application file for complete search history.

(56) References Cited

U.S. PATENT DOCUMENTS

| | | | | |
|---|---|---|---|---|
| 4,468,728 | A | * | 8/1984 | Wang ................ G06F 17/30327 |
| 6,161,144 | A | * | 12/2000 | Michels .................. H04L 12/56 370/392 |
| 6,192,051 | B1 | * | 2/2001 | Lipman ................. H04L 45/742 370/389 |
| 6,289,414 | B1 | * | 9/2001 | Feldmeier ............. G11C 15/00 711/108 |
| 6,578,080 | B1 | * | 6/2003 | Dwork ............... H04L 12/4625 709/227 |
| 7,133,400 | B1 | * | 11/2006 | Henderson ............. H04L 29/06 370/389 |
| 8,032,561 | B1 | * | 10/2011 | Nadj ......................... G06F 7/22 707/799 |
| 9,195,939 | B1 | * | 11/2015 | Goyal ...................... G06N 5/02 |
| 9,558,297 | B1 | * | 1/2017 | Bailey ............... G06F 17/30961 |
| 2002/0126672 | A1 | * | 9/2002 | Chow ..................... H04L 29/06 370/392 |
| 2003/0009474 | A1 | * | 1/2003 | Hyland ............ G06F 17/30961 |
| 2003/0084038 | A1 | * | 5/2003 | Balogh .................... G06F 9/505 |
| 2004/0022243 | A1 | * | 2/2004 | Jason, Jr. ................ H04L 47/10 370/389 |
| 2004/0205359 | A1 | * | 10/2004 | Matsuhira ........... H04L 63/0263 713/154 |

* cited by examiner

*Primary Examiner* — Kevin C. Harper
(74) *Attorney, Agent, or Firm* — Mannava & Kang, P.C.

(57) ABSTRACT

A packet filtering system uses linked zero-based binary search trees to filter received packets. The binary search trees may be generated from filter conditions defining filter parameters for filtering packets.

13 Claims, 9 Drawing Sheets

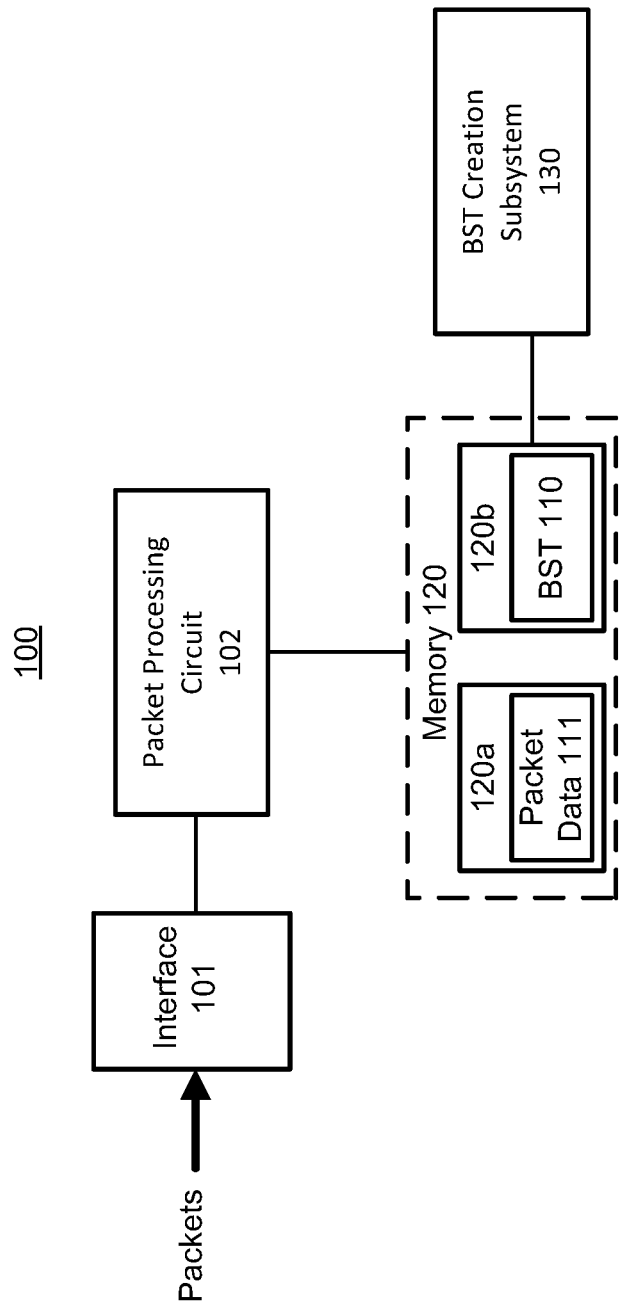

PACKET FILTERING USING BINARY SEARCH TREES

BACKGROUND

In digital networking communications, data is typically transmitted in blocks, or packets, of data. A packet is typically composed of control information contained in a header that conveys information about the packet, such as source and destination addresses, error detection codes, and sequencing information. The remainder of the packet typically consists of the data itself, and a packet trailer with additional information.

Networks commonly use packet filters that apply predetermined filtering rules, such as to determine whether a particular packet may pose a threat to the network or user system, or to direct or capture packet flows. One difficulty in packet filtering is the limited amount of time available to examine each packet. For example, with a minimum packet size of 64 bytes (B) with an 8B preamble and 12B minimum interframe spacing, at 10 Gigabit per second (Gbps) rates, that's only 67.2 nanoseconds (ns) per packet to filter each packet. In practice, there may be even less time to filter each packet due to loss of interframe gap (IFG). For example, a technique called deficit idle count (DIC) that can shrink the IFG down to 8B on individual packets while maintaining an average IFG of 12B.

BRIEF DESCRIPTION OF DRAWINGS

Features of the present disclosure are illustrated by way of example and not limited in the following figure(s) in which like numerals indicate like elements, in which:

FIG. 1 shows a packet filtering system, according to an example of the present disclosure;

DETAILED DESCRIPTION

Figure 2A:
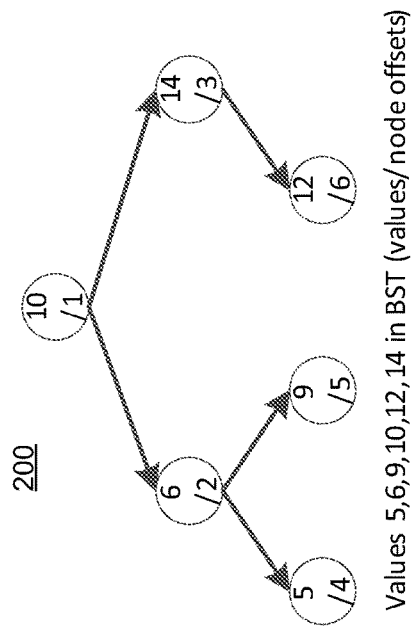
FIGS. 2A-B show binary search trees, according to examples of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the examples of the present disclosure. As used herein, the terms "a" and "an" are intended to denote at least one of a particular element, the term "includes" means includes but not limited to, the term "including" means including but not limited to, and the term "based on" means based at least in part on.

An example of the present disclosure is a hardware linked zero-based binary search tree filter using node instructions and flags to filter standardized data packet information. Filtering may include classifying a packet based on its contents, for example, its source or destination Internet protocol (IP) address. This filtering is used to decide what action, if any, to take regarding the packet, including dropping the packet, forwarding the packet to a particular destination, load balancing, etc.

According to an example of the present disclosure, a hardware packet filtering system uses binary search trees to perform packet filtering. A binary search tree may include a data structure that stores sorted values for fast lookups as is further discussed below. The packet filtering system may receive filter conditions including comparison words, and sorts and arranges the comparison words to create one or more binary search trees prior for packet filtering. Each comparison word may be assigned to a comparison node in the binary search tree, and is compared to a particular packet-region or a particular region-offset word in the packet for packet filtering. If the comparison word is equal to the packet word, i.e., a "hit," then the predetermined action at that node is to be taken. During the filtering, if the packet word is less-than or greater-than (LT/GT) the comparison word of a node in the binary search tree, the filtering process continues to the node's appropriate left or right sub-node where the comparison word of the sub-node is compared to the packet word. Nodes are connected to other nodes in the binary search tree via branches. Nodes having node values greater than a node are connected to the node via at least one greater than branch, and nodes having node values smaller than a node are connected to the node via at least one less than branch.

The filtering progression through the binary search tree continues until the packet word hits, at which point the process will generally either jump to a linked different binary search tree to look at another packet-region/region-offset packet word, or the system finishes the filtering and logs the filter actions, such as direction to particular destinations. If the packet word doesn't hit on any node (e.g., no match to the comparison word of any of the nodes), no filter action is performed, at least for that particular packet-region/region-offset word. Additionally, the packet filtering system may process nodes with particularized conditions in addition to key values. The system may also mask words in a packet, for example, to allow the filtering to examine less than 32-bits at a time, such as for comparing to protocol bytes, or a Multiprotocol Label Switching (MPLS) net-mask.

As is further discussed below, the packet filtering system may include packet buffering and filtering techniques and may use optimized, linked, zero-based binary search trees that allow for increased speed in packet filtering.

FIG. 1 illustrates a packet filtering system 100, according to an example of the present disclosure. The packet filtering system 100 includes an interface 101, which can receive packets to be filtered. The packets may be received at typical transmission rates, e.g., 10 Gbps; the packets may be transmitted or received via the interface 101 at other rates. The packets may be in a communication stream of data packets. A packet processing circuit 102 performs packet filtering based on one or more binary search trees 110 (shown as BST 110) stored in memory 120. The packet processing circuit 102 includes hardware, such as e.g., field programmable gate arrays (FPGAs) or other suitable hardware that can perform packet processing and filtering operations at line rates. As is further discussed below, the binary search trees 110 may include zero-based binary search trees and/or a plurality of zero-based binary search trees that are linked. In an example, the memory 120 may include memory 120a for storing received packet data 111, such as data (e.g., field values) from packets received via the interface 101, and memory 120b for storing the binary search trees 110.

For example, the memory 120a may temporarily store a received packet (or at least a portion of the start of the packet to be processed) as the packet data 111, and the memory 120b may store the binary search trees 110 for comparison to the packet data 111 stored in memory 120a. In an example, the memory 120b to store the binary search trees 110 may include a block random-access memory (BRAM), and the memory 120a to store the packet data 111 may include logic random-access memory (LRAM). However, any suitable memory may be used for memory 120, and the same memory may be used to store the binary search trees 110 and the packet data 111. A binary search tree may be stored in the memory 120b as a series of data structures representing nodes in the binary search tree, and the packet data 111 may be stored and processed as 32-bit values (or in other word sizes).

The data structures of a binary search tree stored in the memory 120b contains comparison values (e.g., keys) and packet-region/region-offset values that define the packet word to be compared to the node value. For example, the packet-region/region-offset identifies the field (or portion of a field) of a received packet to be compared to keys of the binary search tree in order to identify matches and to perform a filter action in response to a match or in response to no match. The data structures of the binary search tree may also include addresses of next binary search trees to goto, as well as the results of the filter when the word of a search has been found (i.e., a hit). In addition, the data structures may store various flags including don't care flags, range flags and others that make the hardware logic of the processing circuit 102 more optimized, as is further discussed below.

To store a data structure for a binary search tree in the memory 120b, it is converted to a number that contains all the fields of the data structure. In a non-limiting example, that number may be defined as a 128-bit value but other sizes may be used.

The packet data 111 may be stored in the memory 120a, 32-bits at a time, starting at the beginning of the packet. In an example, in order to increase the speed of processing, the memory 120a may be divided in half so that while one packet is being written to one half of the random-access memory (RAM) of the memory 120a, the previous packet can be read out of the other half of the RAM. Each half may be half the memory addresses of the RAM.

The packet processing circuit 102 compares packet data 111 to keys of the binary search trees 110. If a match is found, a filter action corresponding to the match may be performed. The filtering action may include capturing a packet for further analysis, dropping a packet, sending a packet to a particular destination, counting a packet, etc. The packet processing circuit 102 is shown as receiving packets via interface 101. The packet processing circuit 102 may also transmit processed packets through the interface 101 or another interface.

The packet filtering system 100 may also include binary search tree (BST) creation subsystem 130 for creating the binary search trees 110 and storing them in the memory 120b. The BST creation subsystem 130 may include a processing and other computer components for creating the binary search trees 110. Operations for creating the binary search trees 110 are further discussed below. Furthermore, the packet filtering system 100 may be part of a capture card or a line card.

In general, binary search trees store keys. The keys are data items that are searched in the binary search tree. Binary search trees keep their keys in sorted order, so that lookups and other operations can search the binary search as follows: when looking for a node key in a tree, the tree is traversed from root to leaf, making comparisons to keys stored in the nodes of the tree and deciding, based on the comparison, to continue searching in left or right subtrees. A binary search tree is a rooted binary tree, whose nodes each store a key and each have two distinguished sub-trees, commonly denoted left and right. The binary search tree additionally satisfies the following properties: the key (e.g., the key value) in each node must be greater than all keys (e.g., the key values) stored in the left sub-tree, and smaller than all keys (e.g., the key values) in the right sub-tree. FIG. 2A is an example of a rooted binary search tree 200. Assume a list of keys 10, 14, 12, 9, 6 and 5. The keys are sorted and arranged according to the binary search tree properties as described above. In FIG. 1, underneath each value is a node number that starts with 1 for the root node. The LT paths, which are the left subtree paths, all go to nodes with an even node number, and the GT paths, which are the right subtree paths, all go to odd node numbers. At a particular node N, the next node number can be calculated as 2*N+GT where GT is 1 if the comparison is greater-than.

Figure 2B:
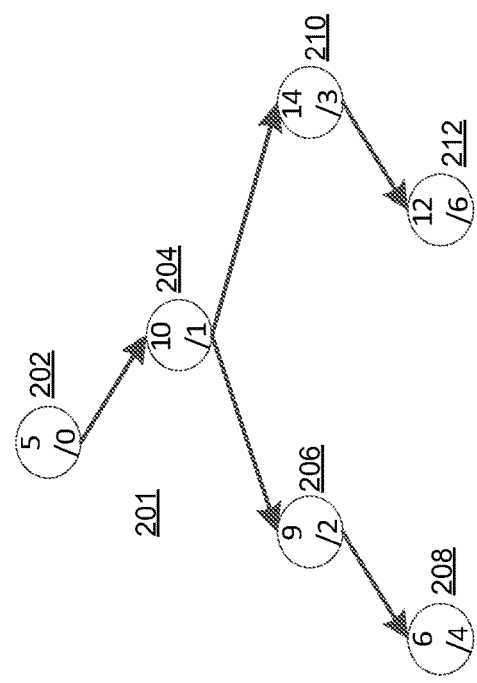

The packet filtering system 100, according to an example of the present disclosure, may use zero-based binary search trees, where the smallest node value is the root of the zero-based binary search tree. FIG. 2B shows an example of a zero-based binary search tree 201 which may be used by the packet filtering system 100 of the present disclosure. The key values in the binary search tree 200 of FIG. 2A are also used in the zero-based binary search tree 201 of FIG. 2B to illustrate the differences between the binary search tree 200 and the zero-based binary search tree 201. In the zero-based binary search tree 201, the smallest node value "5" is the root of the tree 202 (i.e., root node 0). The remainder of the binary search tree, nodes 204, 206, 208, 210, and 212, not considering the root 202, is a normal typical binary search tree construct.

The zero-based binary search tree 201 may be implemented as a table, and the node numbers represent offsets into the table. In an example, the offsets into the table represent memory offsets of memory storing the zero-based binary search tree 201. For the zero-based binary search tree, the address of any node in the tree starts at address A plus a node number. As indicated above, the smallest key of the zero-based binary search tree is placed at root node number 0, and then the rest of the zero-based binary search tree is constructed as usual. Once the zero-based binary search tree is created with its sorted and arranged keys, it may be searched to perform packet filtering by the packet filtering system 100. Also, since the smallest valued node is at offset 0 of the zero-based binary search tree, the next node can still be calculated as A+2*N+GT where N is the current node number and GT is 1 if the comparison is greater-than.

According to an example of the present disclosure, the packet filtering system 100 may implement range value comparisons at each node of the zero-based binary search tree. A zero-based binary search tree used by the packet filtering system 100 may include specialized nodes, referred to as range nodes, where a key of the node may be a range. A node typically contains a single comparison value. For a range node, the key of the node may be set to a range of comparison values. Range nodes may be used, for example, for filtering by comparing a packet source IP address to a range of IP addresses, such as a range from 192.168.0.2 to 192.168.0.99. So the key for the range node is the range of IP values. In another example, instead of searching for, for example, values 6 and 9, the packet filtering system 100 may search instead for 6 through 9. To accomplish this, the packet filtering system 100 uses a range flag, also referred to as RNG. In use, a range flag is added to a node value at the upper end of the range, for example, in FIG. 2B, a range flag may be set at node 2, 206, with value 9.

The range flag is read by the packet filtering system that besides a normal "hit," where a packet value is equal to the node's value (i.e., a match), if the value is less-than the node's value, then there is a provisional "range-hit." The range-hit is provisional, because it is not known from the one hit whether the value is greater-than or equal to the lower-end of the range, which is determined as the binary search continues to traverse down the sub-tree less-than path (LT path). In this case, the next less-than node is node 4, 208, having 6 as a key value. The key value is also referred to as the node value or comparison value. If the comparison value is a hit on 6, the filtering process continues as normal. However, if the comparison value is greater than 6, then it is determined that the value is within the range stated when the comparison hit the range flag at node 2, 206, and the packet filtering system 100 treats the provisional range-hit as a hit for node 2, 206.

According to an example of the present disclosure, the packet filtering system 100 may compare a value from a packet to a single word or multiple words at a node. A typical binary search tree has a single key value for a node. For packet filtering, the values to compare may have different sizes in different circumstances. For example, comparisons may be performed for a 4B IPv4 address, or a 16B IPv6 address, or possibly an even longer string of bytes in the packet's payload.

To extend binary search tree comparisons to multiple words, the packet filtering system 100 creates one or more binary search trees for each word. A word is a predetermined number of bits. For example, a word may be 32 bits/4 bytes or some other size. The packet filtering system 100 creates a plurality of zero-based binary search trees that are linked for comparison to multiple words. For example, a first binary search tree may consist of all terms that use the first word. A term, for example, is a key value. Inside of each node, besides the term's value, a goto address is stored that points to another binary search tree that handles the next word for all hits of the first word term. Each node might be viewed as having a goto address to jump to a separate second-word binary search tree. However, successive trees may be combined. For example, if examining the two IP addresses used in the range example above, 192.168.0.2 through 192.168.0.99, a byte at a time, the packet filtering system 100 may use four binary search trees.

Figure 3:
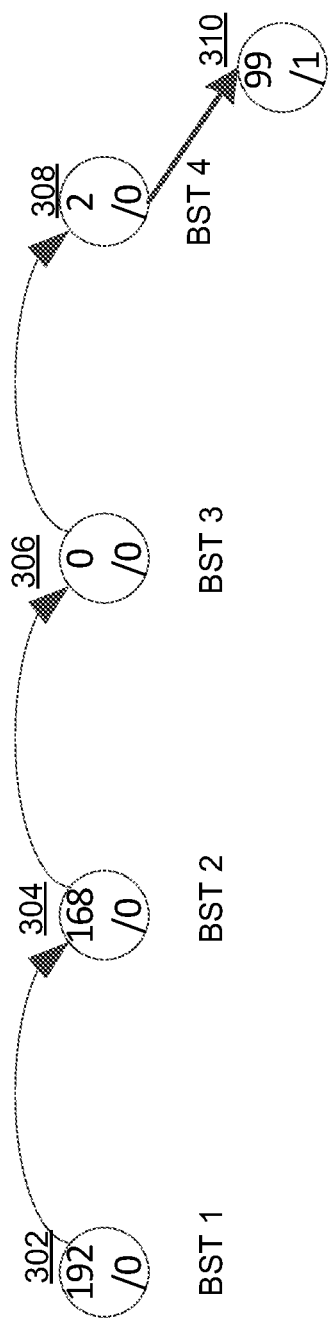
FIG. 3 shows an example of linked zero-based binary search trees according to the present disclosure.

FIG. 3 discloses, in this example, that the first tree might contain a single node with a key value of 192, in binary search tree 1 (BST 1) 302, and upon a hit, the comparison jumps to the second binary search tree 304. Then, the tree with just 168, 304, jumps to BST 3, 306 with just 0, which finally jumps to BST 4, 308 with two nodes 308 and 310 with keys 2 and 99, respectively. The packet filtering system 100 may only examine the last tree BST 4 if the first three trees BSTs 1-3 resulted in hits.

BSTs 1-4 are examples of linked zero-based binary search trees that may be implemented in hardware packet filtering. For example, performing a 16B (or even longer) comparison in hardware may not be feasible given packet transmission rates. The linked zero-based binary search trees of the packet filtering system 100 may perform comparisons on smaller chunks of data, such as a comparison on 1 byte, or 2 bytes or even 4 bytes. The bigger the word, the more of the packet gets analyzed in each clock cycle, but at the cost of more logic resources and the tougher it is to meet timing inside the hardware (e.g., FPGA or other hardware) of the packet filtering system 100. In an example, comparing to a 32 bit/4B word may be performed as that is the width of the packet word at 10 Gbps wire speed at a 312.5 MHz clock rate.

A filter may include several terms OR'd and/or AND'd together. Some of those terms may not contain all or any of the same search words of the other terms. As an example, imagine IP addresses are a single byte, and the filter is to identify all packets that have a particular source IP address (e.g., 12) and a particular destination IP address (e.g., 53), and the filter is to identify all packets that go to a particular destination IP address (e.g., 41) but may be from any source IP address. In this example, the filter looks at the source IP address of a packet and compares it to 12, and if there is a hit, looks at the destination IP address and determines whether it is a 53. In addition, no matter what the source IP address, the filter also determines whether the destination IP address is 41.

Figure 4:
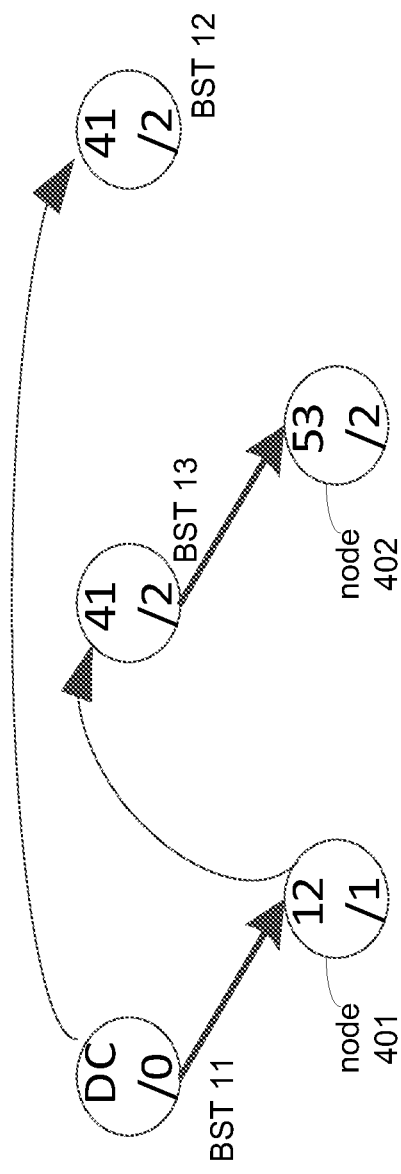
FIG. 4 shows an example of linked zero-based binary search trees with a don't care node, according to the present disclosure.

According to an example of the present disclosure, the packet filtering system 100 may use a don't care (DC) node to handle the situation discussed above, such as shown in FIG. 4. "Don't Care" for the packet filtering system 100, for example, refers to a packet filtering comparison where the output of the comparison does not matter when determining whether to perform an action associated with the comparison. A DC node, for example, refers to a node of a binary search tree where a packet filtering comparison may be performed but the results of the comparison are ignored. The action of the DC node is performed regardless of the results, and the action may be performed after processing the current BST. In FIG. 4, the DC node 0 is placed at the root of a linked zero-based binary search tree (BST 11), and saves a goto address to another binary search tree (BST 12) that handles packets that do not hit in the current BST (e.g., BST 11 and BST 13). The DC node 0 is connected to a single subtree through a greater than branch. If there is a hit in the current BST, such as a match of the packet value to the node value of at node 401 (i.e., the source IP address of the received packet is 12), then an action associated with the hit at node 401 is taken and the DC action, which is a jump to BST 12, is postponed until after the completion of the traversal of nodes in BST 11 and BST 13. A hit at node 401 causes the processing to jump to BST 13 to look for a destination of 53 as well as 41, so those values are combined in the second word BST 13 jumped to from node 401. But, if the source IP address of the received packet is not a 12, the packet filtering system 100 skips BST 13 and proceeds to BST 12 to check for a match with a destination IP address of 41. In addition, referring again to the above example, regardless if the source address is equal to 12 or not in BST 11, the destination needs to be compared to 41, so after completing the comparison of the source address to 12 in BST 11, and possibly the destination address in BST 13 if the source address was 12, the DC action of node 0 in BST 11 causes the filter to goto BST 12 and compare the destination IP address of 41.

IP addresses for IPv4 and IPv6 are at different offsets in the IP header, and they are of different lengths. In filtering a packet, a search for an IPv4 address on an IPv6 packet is performed such that the filter binary search trees do not accidentally call a packet a hit by looking at words in the IPv6 packet header that are unrelated to an IPv4 IP address. Similarly, the packet filtering system 100 may want to filter on a particular field in an IPv4 header or a particular field in an IPv6 header, and the packet may have either an IPv4 or an IPv6 header. To handle those types of filtering problems, according to an example of the present disclosure, the packet filtering system 100 uses the concept of a packet region miss. A packet region miss may include not finding a predetermined region of a packet, such as an IPv4 header region or an IPv6 header region. A DC node may check for a packet region miss. If a packet region miss occurs at the DC node, then this results in a completion of the processing of the current BST and processing jumps to the BST referenced by the DC node. For example, if the DC node is in a BST for filtering on an IPv4 header, a miss at the DC node may result in jumping to a BST for filtering on an IPv6 header, so no time is wasted checking for any matches for an IPv4 header since the packet does not contain an IPv4 region.

Figure 5:
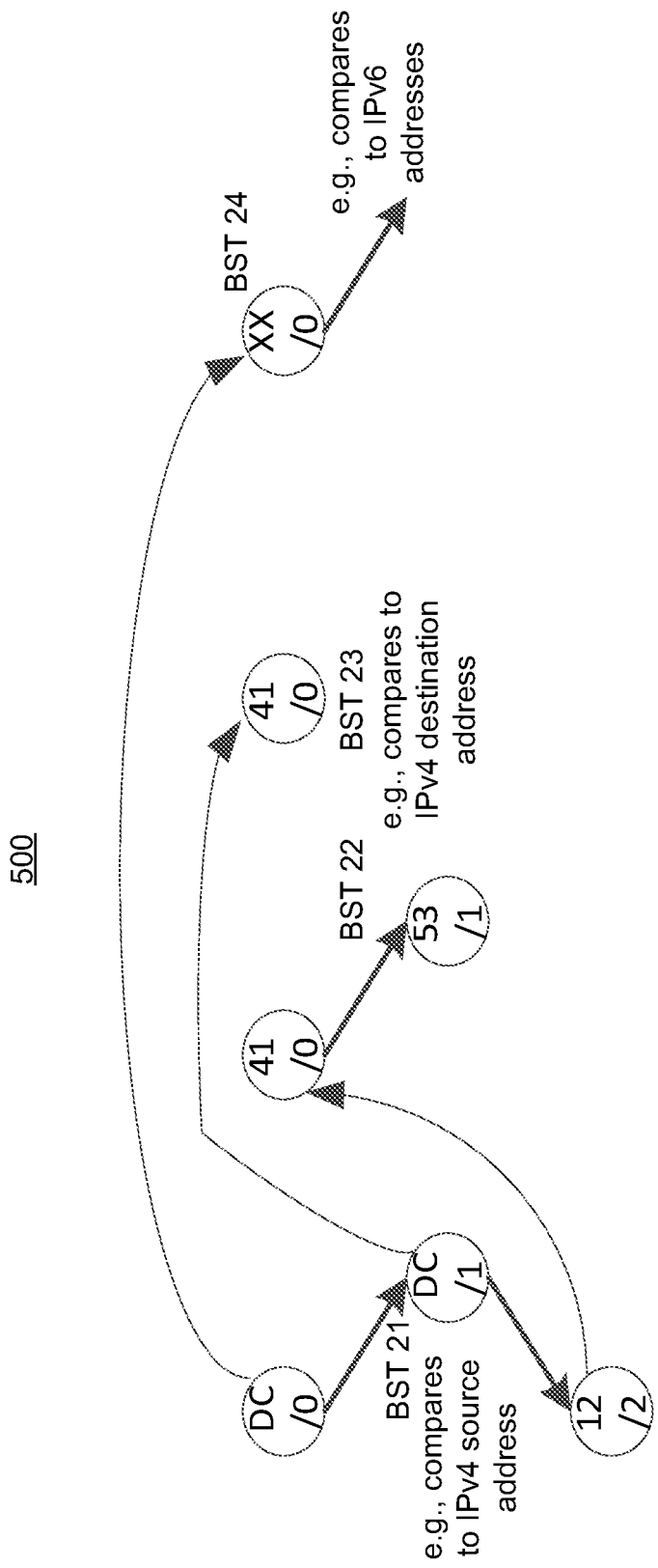
FIG. 5 shows an example of linked zero-based binary search trees with multiple don't care nodes, according to the present disclosure.

As discussed above with respect to FIG. 4, the packet filtering system 100 may handle don't care terms, such as when the source IP address of the packet does not match 12, the search jumps to BST 12. Expanding on this example, as shown in FIG. 5, assume the first tree BST 21 handles comparisons to an IPv4 source address, and the following two trees, BST 22 and BST 23, handle the IPv4 destination address. Further, assume the filtering includes performing a comparison to predetermined IPv6 addresses (shown as "XX") of linked BST 24 to identify matches. If the packet region is a miss (i.e., no match) on the IPv4 source comparison (because the packet is IPv6 for example), the filter does not need to examine the IPv4 destination tables but instead, it is more efficient to jump to a table that only handles the remaining possibilities. Since there is a miss at DC/0, the processing jumps to BST 24. But if there is match at DC/0, processing proceeds DC/1. At DC/1, processing jumps to BST 23, which happens after traversing BST 21 (and possibly BST 22). Thus, DC/1 overrides the actions of DC/0. In other words, use of the second DC node allows only processing BST 24 if BST 21 was a packet region miss. Use of the second DC node (DC/1) allows the processing to skip BST 24 if there was a packet region match at DC/0, thus saving processing time.

In an example, each comparison value (i.e. key value) and packet value may be 32-bit words (4 bytes), no matter what part of a packet they represent. The word size may create unnecessary comparisons if the filter only needs to examine a small portion of the word, such as 1 byte of a packet header, for example the IP header protocol field or a 3-bit VLAN priority code field. According to an example of the present disclosure, the packet filtering system 100 may add a mask field to a node. The mask allows bits in a field to be ignored (e.g., masked), so the unmasked bits may be read and used in a filtering comparison operation. In an example, a 32-bit mask may be used to allow individual bit masking.

Figure 6A:
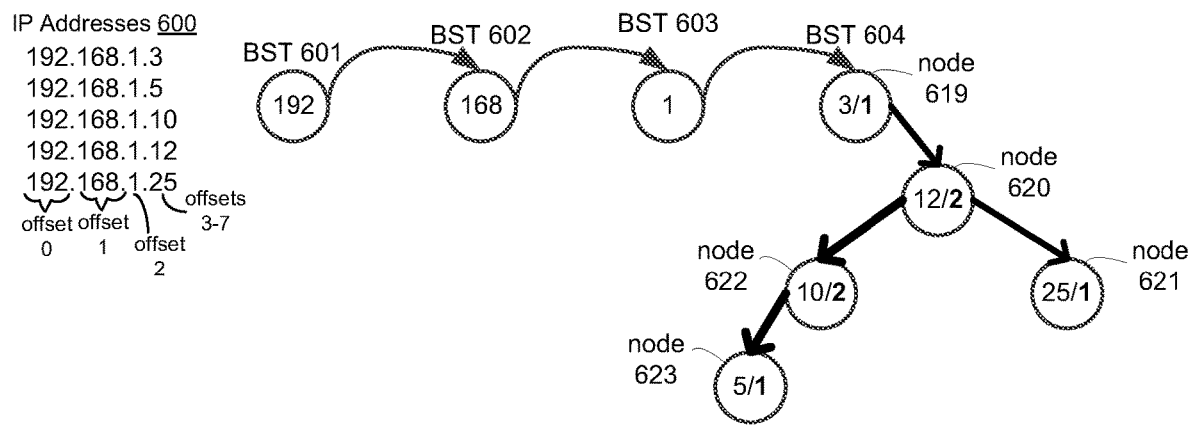
FIGS. 6A-B show an example of binary search tree filter parameters or conditions and creating binary search trees.
Figure 6B:
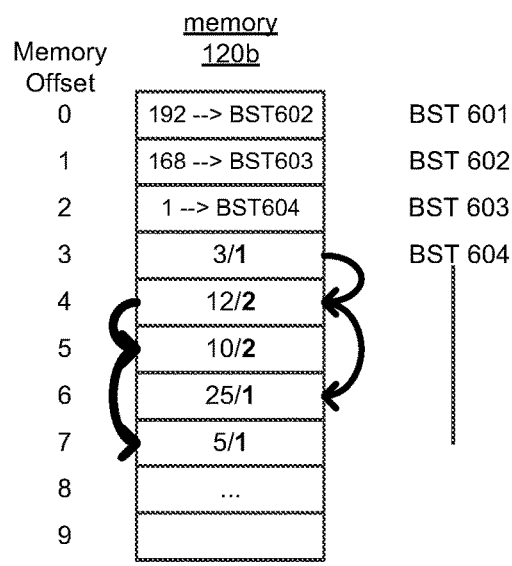

FIGS. 6A-B show an example of linked binary search trees BSTs 601-604 and packet filtering processing which may be performed by the packet filtering system 100 for filtering packets for the IP addresses 600. In this example, 8-bit words are used for simplicity. BST 601-604 may be stored in memory 120b of the packet filtering system 100. As shown in FIG. 6B, the BSTs 601-604 may be stored in the memory 120b at different memory offsets of a predetermined memory location. For example, the node values for the BSTs 601-604 which correspond to values for the IP addresses 600 are stored in the memory offsets 0-7. Each BST is stored in its own memory offset and a BST may include node values stored at multiple memory offsets, such as for BST 604. FIGS. 6A-B show that when traversing the BSTs 601-604, the filtering jumps to the next BST if there is a hit in the previous BST. For example, if a packet word of a received packet is equal to the node comparison value, then the link to next BST is taken (if present) and the result is accumulated (if present). For example, if the packet value is "192" then there is a hit at BST 601, and the processing jumps to BST 602. If there is a hit at BST 602, processing jumps to BST 603. If there is a hit at BST 603, processing jumps to BST 604. If the packet word is less than node comparison value and a left-child is present, then a move to the less-than node is taken, such as from node 620 to node 622 and node 622 to node 623. If the packet word is greater than node comparison value and a right-child is present, then a move is taken to the greater-than node, such as from node 619 to node 620 and node 620 to node 621. If not equal, and a less/greater-than node is not present, then processing for the current BST is done. Also, the bolded values for each node represent the action bit mask. The action bit mask identifies the action to be performed if there is a hit at the node, such as store the packet at a particular memory location for further processing, discard the packet, etc. For example, node 619 includes 3/1. For node 619, 3 represents the node value, and 1 represents the action bit mask. For node 620, 12 represents the node value, and 2 represents the action bit mask, and so on for each node of BST 604.

Figure 7:
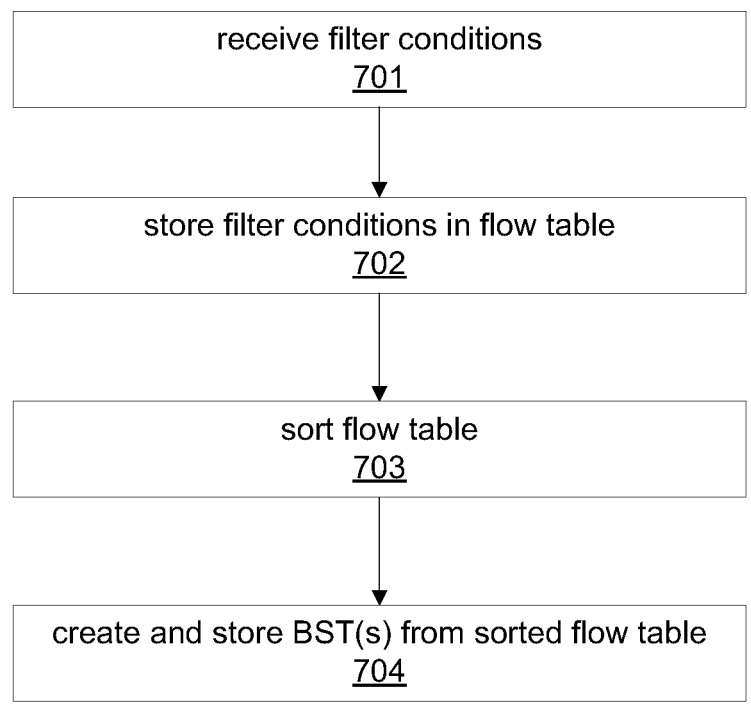
FIG. 7 shows a method of creating binary search trees, according to an example of the present disclosure.

A method 700 for creating one or more binary search trees, which may be stored in the memory 120b shown in FIG. 1, is shown in FIG. 7. The method 700 may be performed by the BST creation subsystem 130. In an example, the BST creation subsystem 130 may comprise a processor and a non-transitory machine readable medium storing machine readable instructions that are executed by the processor to perform the method 700. At 701, packet filter conditions for a filter are received. The filter is implemented by the packet filtering system 100 and is to be embodied in one or more binary search trees created by the method 700. In an example, the filter conditions may be provided by a user, for example, via a user interface, which may be part of the BST creation subsystem 130 shown in FIG. 1. In another example, the filter conditions may be received from another system and/or a user. The filter conditions may include values for comparing to packet values, such as the IP addresses 600 shown in FIG. 6A, and actions to perform if there is a hit (e.g., a match on an IP address). At 702, a flow table is created that includes the filter conditions. At 703, the flow table is sorted. For example, the keys or node values are ordered in the flow table, so that lookups and can search the binary search as follows: when looking for a node key in a tree, the tree is traversed from root to leaf, making comparisons to keys stored in the nodes of the tree and deciding, based on the comparison, to continue searching in left or right subtrees. At 704, the BSTs are created based on the sorted table and stored in memory. Each BST is stored at its own memory offset or memory offsets, such as shown in FIG. 6B.

Figure 8:
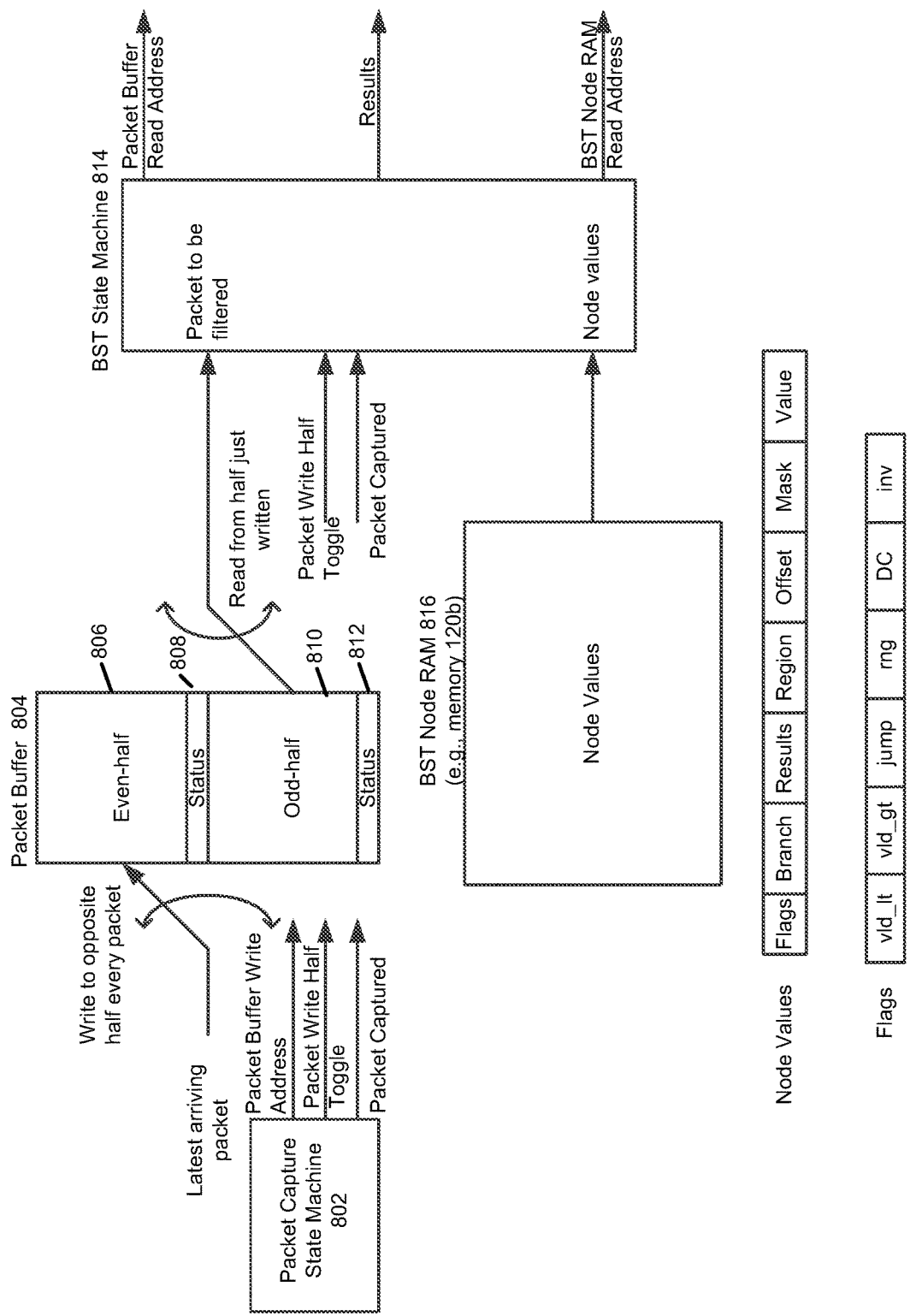
FIG. 8 shows an example of hardware for the packet filtering system, according to an example of the present disclosure.

FIG. 8 discloses a block diagram of an example of hardware for the packet filtering system 100. The hardware may include hardware for the packet processing circuit 102 and the memory 120. As discussed above, to increase the speed of processing, the memory 120*a* may be divided in half so that while one packet is being written to one half of the random-access memory (RAM) of the memory 120*a*, the previous packet can be read out of the other half of the RAM, which is further described below with respect to FIG. 8.

A packet is received, for example, via interface 101 shown in FIG. 1. Referring back to FIG. 8, the received packet is captured and processed by packet capture state machine 802. The packet capture state machine 802 writes the packet to packet buffer 804. Each arriving packet is written to one-half (½) of the packet buffer, such as the even-half 806. The selected half alternates every packet between the even-half 806 and the odd-half 810. The filtering process is performed on the opposite half of the buffer. If, for example, the packet is greater than the depth of the buffer (e.g., exceeding the size of the buffer), then the remainder of the packet greater than one-half the depth may not be captured. The last location in a one-half of the buffered packet is written with a packet status word.

The even-half of the packet buffer 806, is shown in FIG. 8 as being written to with the arriving packet data for example by communicating the packet buffer write address, the packet write half toggle, and the captured packet. At the same time, the odd-half of the packet buffer 810, is set to be read by binary search tree state machine 814, such as by communicating the packet write half toggle signal and the captured packet data. Statuses of the even-half 806 and the odd-half 810 of packet buffer 804, are tracked by statuses 808 and 812, respectively. BST filter state machine 814 may not begin to process the packet until it is signaled from the packet buffer that the capture of the packet is complete. BST filter state machine 814 outputs packet buffer read addresses, results, and BST node RAM read addresses.

The memory 120*b* shown in FIG. 1 may include—BST node RAM 816 shown in FIG. 8. Linked binary search trees are represented as nodes in the BST node RAM 816. Each node may include node values comprising flags, a branch to any linked BST, comparison results, packet region which may include a packet offset from which to grab a packet word to be compared to a key value, a comparison value (e.g., key value), and a comparison mask. Flags are described below. The branch is the location (in BST Node RAM) of the start of the next linked BST to be processed if the current node is a hit. Results may include a bit mask that gets OR'd to any current results if the current node is a hit. Region and offset are used to select a word from the packet buffer to be compared to the current node's value. The packet offset covers a range of one-half (½) of the packet buffer size. Mask and value are used in comparisons to the selected word from the packet buffer. Any bits in the mask that are '1's cause the respective bit in the packet buffer word to be masked (converted to '0's). The resulting packet buffer word, after masking, is compared to the node value. The results of the comparison are used to determine if processing should progress down the left (less-than) or right (greater-than) sub-tree, or use the current node's actions (equal).

Examples of flags are also shown. Valid less-than and greater-than flags (vld_lt/vld_gt) signify that there exists left (less-than) and right (greater-than) children to the current node. Jump flag signifies that there is a linked binary search tree that should be jumped to if the comparison to the current node's value is equal. Range (RNG) flag signifies that the current node's actions (results and/or jump) should be taken if the comparison to the current node's value is less-than or equal, and no equal comparisons are made further down the current BST. The DC (don't care) flag signifies that the current node's actions should be taken after all comparisons are made in the current BST. Unlike the range flag, the DC flag causes equal comparisons to be ignored, e.g., an equal comparison at the super-node (e.g., root node of the zero-based binary search tree) gets converted to a greater-than comparison, and at any other node in the tree to a less-than.

Figure 9:
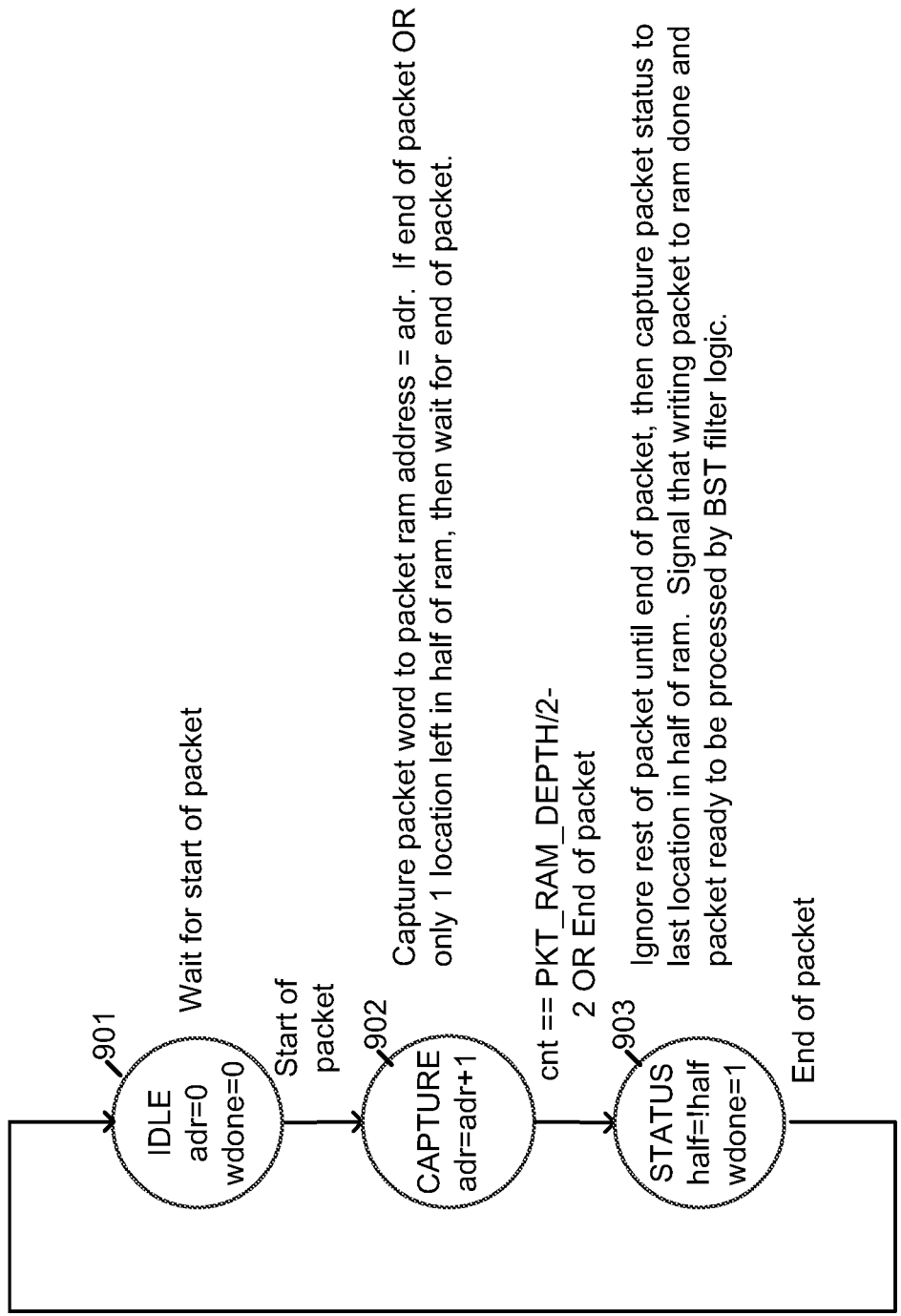
FIG. 9 shows a packet capture state machine, according to an example of the present disclosure.

The state machines of FIG. 8 may be implemented by the packet processing circuit 102. FIG. 9 shows packet processing performed by the packet capture state machine 802 of FIG. 8 for capturing a packet to be filtered. The packet capture state machine 802 may be implemented by the packet processing circuit 102 shown in FIG. 1. As shown in FIG. 9, the packet capture state machine 802 is in an idle state and waits for the start of a packet at 901. When a packet is detected, the packet capture state machine 802 transitions to a capture state at 902. In the capture state, the packet capture state machine 802 writes packet data to the packet buffer 804, which may be part of the memory 120*a* shown in FIG. 1. For example, the packet buffer write address is determined which may be dependent on which half of the packet buffer 804 is being written to. If there is only one location left for writing to the particular half of the packet buffer 804 and the entire packet is not written to the particular half of the packet buffer 804, then the packet capture state machine 802 ignores the remaining part of the packet and waits for the end of the packet. In status state 903, the status is written to the last location of the particular half of the packet buffer 804, and a signal is generated to the BST filer state machine 814 that the packet data in the particular half of the packet buffer 804 is ready to be processed. The status may include a packet a status, such as whether packet data passes a cyclic redundancy check or other types of status. The stored status may be used for filtering. For example, filtering conditions for the packet status may be included in a BST.

Figure 10:
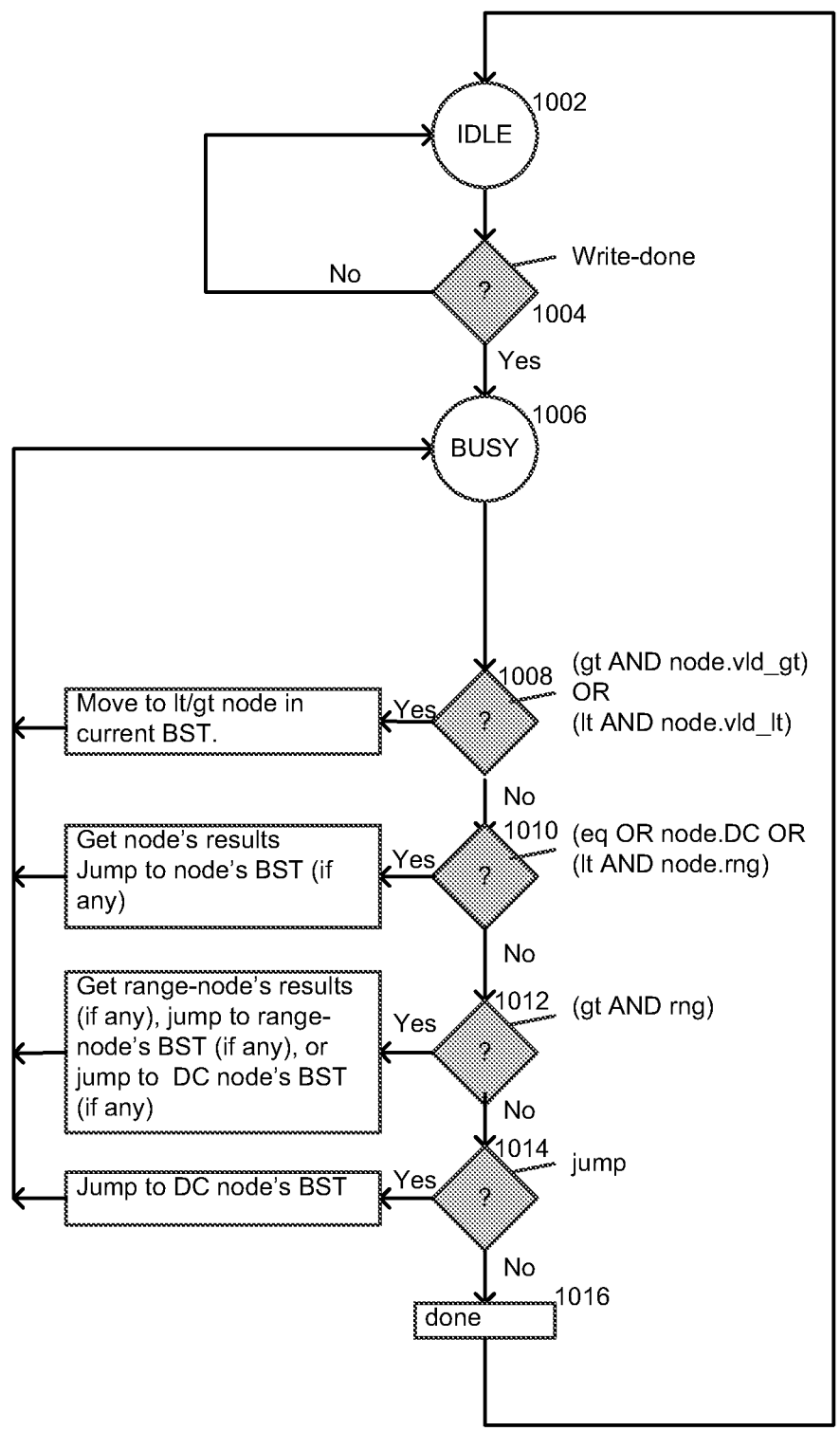
FIG. 10 shows a packet filter state machine, according to an example of the present disclosure.

FIG. 10 shows packet processing which may be performed by the BST filter state machine 814 of FIG. 8 for filtering packets. The BST filter state machine 814 may be implemented by the packet processing circuit 102 shown in FIG. 1. As shown in FIG. 10, at 1002 and 1004, the BST filter state machine 814 is in an idle state and waits for the packet to be captured. When the BST filter state machine 814 is signaled by the packet capture state machine 802 that the packet is captured and ready to be processed, the BST filter state machine 814 begins at 1006 to process the packet through the nodes of the binary search trees 110 stored in the BST Node RAM 816 shown in FIG. 8. For example, at 1008, the packet data is processed through the first node of the first zero-based linked binary search tree to determine whether the packet word from the specified offset of the specified packet region, after applying the specified mask, is greater than (GT) the node comparison value or less than (LT) the node comparison value, and the respective LT/GT node is valid. Valid means there is a node to the left (less than) or right (greater than) of the current. If so, processing advances to the determined LT/GT node and the state machine goes back to 1006. If not, such as if the LT/GT is not valid or the comparison value is equal to the node value, then the BST filter state machine 814 progresses to 1010. At 1010, three separate determinations are made as follows: determine whether the current node's value equal to the masked packet word; determine whether the current node has the DC flag set; and determine whether the current node has the RNG flag set and the comparison was LT. If any of these determinations above are true, then the results from the current node, if any, are logically OR'd to the filter results (which get initialized to null at 1002). The results are the actions performed in response to a match and are represented by a bit mask that identifies each action. In addition, if the current node has a linked BST, it is jumped to for further processing. For example, referring to FIG. 4, node 401 jumps to BST 13 for further processing if the selected packet word is equal to 12. If the current node does not have a linked BST, and a previously processed DC node has been traversed in the processing through the current BST, then it's linked BST is jumped to for further processing, and the state machine goes back to 1006. For example, referring to FIG. 4, node 402, the node DC/0 is the previously processed DC node, and the packet processing jumps to BST 12 if the selected packet word is equal to 53. If all of the three determinations at 1010 are false, then the state machine progresses to 1012. At 1012 and 1014, actions from previously traversed nodes in the current BST are performed. If the results of the current comparison is GT and a previously traversed node had the RNG flag set, then the range comparison is true. The results from the RNG node, if any, are logically OR'd to the running filter results. If the RNG node has a linked BST, it is jumped to for further processing, else, if a previously processed DC node has been traversed, then its linked BST is jumped to for further processing. If the results of the current comparison are not GT, then the state machine progresses to 1014. At 1014, if a previously traversed node was a DC node, then, jump to the DC node's BST. If not, the filtering is done, at 1016.

While preferred embodiments are disclosed herein, many variations are possible which remain within the concept and scope of the inventions. Such variations would become clear to one of ordinary skill in the art after inspection of the specification, drawings, and claims herein. This invention therefore is not to be restricted except within the spirit and scope of the appended claims.

What is claimed is:

1. A packet filtering system comprising:
   an interface to receive a data packet from a data packet communication stream;
   a memory to store binary search trees;
   a packet processing circuit to filter the data packet by comparing packet values from the packet to node values of the binary search trees based on filter conditions, wherein:
   the binary search trees comprise linked zero-based binary search trees, and each of the linked zero-based binary search trees comprises:
   a root node having a smallest node value of any nodes of the linked zero-based binary search tree, wherein the root node is connected to a single subtree; and
   an address of a next linked zero-based binary search tree to traverse to filter the packet in response to a hit on a previous linked zero-based binary search tree; and
   the filter conditions comprise:
   comparison words such that the packet processing circuit sorts and arranges the comparison words to create the binary search trees for data packet filtering; and
   mask words to allow bits in a field to be ignored so that unmasked bits may be read and used in a filtering comparison operation, wherein the filtering comparison operation generates at least one of the following results: a hit if comparison words are equal to packet words, a less-than (LT) if comparison words are less than a node in the binary search tree, or a greater-than (GT) if comparison words are greater than a node in the binary search tree; and
   a second memory to temporarily store at least a portion of the packet.

2. The packet filtering system of claim 1, wherein the root node is connected, via a branch, to the single subtree comprised of nodes having node values greater than the node value of the root node.

3. The packet filtering system of claim 1, wherein the address is compared to at least a source address or destination address.

4. The packet filtering system of claim 1, wherein the second memory to store node values at various memory offsets.

5. The packet filtering system of claim 1, wherein to compare packet values from the packet to node values of the binary search trees results in a hit or a miss on the node values, and upon determination of the hit or the miss, a filter action is performed comprising inserting the data packet into the data packet communication stream or removing the data packet from the data packet communication stream.

6. The packet filtering system of claim 1, wherein the packet values comprise portions of network addresses.

7. The packet filtering system of claim 1, wherein a node in at least one of the binary search trees is a range node indicating a range of key values.

8. The packet filtering system of claim 7, wherein the range node specifies an upper end of the range of key values for comparison to the packet values.

9. The packet filtering system of claim 1, wherein the root node in at least one of the binary search trees is a don't care node that is linked to another of the binary search trees to perform further filter processing after the processing of the binary search tree with the don't care node.

10. The packet filtering system of claim 9, further comprising a second don't care node connected to the don't care node, wherein the second don't care node is in a greater than subtree of the don't care node and actions of the second don't care node override the don't care node.

11. The packet filtering system of claim 1, wherein at least one of the node values comprises multiple alternative values OR'd together.

12. The packet filtering system of claim 1, wherein a branch of at least one of the binary search trees comprises multiple binary search trees AND'd together.

13. The packet filtering system of claim 1, wherein at least one node of the binary search trees includes a mask to mask at least a portion of a key value of the node for comparison to the packet values, wherein the mask may be a 32-bit mask to that allows filtering to examine less than 32-bits at a time and filtering to compare to protocol bytes, or a Multiprotocol Label Switching (MPLS) net-mask.

* * * * *